United States Patent

[11] 3,579,113

[72] Inventors Kamil Y. Jabbar
River Grove;
Ole K. Nilssen, Bensenville, Ill.
[21] Appl. No. 807,372
[22] Filed Mar. 14, 1969
[45] Patented May 18, 1971
[73] Assignee Motorola, Inc.
Franklin Park, Ill.

[54] ANTENNA COUPLING CIRCUIT
7 Claims, 2 Drawing Figs.

[52] U.S. Cl. .......... 325/376, 325/381, 325/383, 325/464
[51] Int. Cl. .......... H04b 1/18
[50] Field of Search .......... 325/318, 365, 368, 373, 374, 376, 381, 382, 383, 384; 334/26, 14; 343/704

[56] References Cited

UNITED STATES PATENTS

| | | | |
|---|---|---|---|
| 3,029,339 | 4/1962 | Pan .......... | 325/381X |
| 3,192,491 | 6/1965 | Hesselberth et al. .......... | 325/383X |
| 3,289,087 | 11/1966 | Birkenes .......... | 325/383 |
| 3,386,033 | 5/1968 | Copeland et al. .......... | 325/373 |

*Primary Examiner*—Benedict V. Safourek
*Attorney*—Mueller and Aichele

ABSTRACT: A high impedance capacitive antenna is coupled in series with a low impedance resistive load in the form of the input circuit of an RF transistor amplifier through a series-tuned circuit including a varactor diode connected in series with an inductor. A source of DC biasing potential is provided to vary the biasing voltage on the diode in order to change its capacitance to tune the circuit over a predetermined band of frequencies. The circuit operates to transfer constant power at constant bandwidth from the antenna to the load over a wide range of frequencies, utilizing only a restricted range of capacitance change of the diode capacitance.

Patented May 18, 1971 3,579,113

INVENTORS.
KAMIL Y. JABBAR
OLE K. NILSSEN
BY Mueller, Aichele & Rauner
ATTORNEYS.

ANTENNA COUPLING CIRCUIT

BACKGROUND OF THE INVENTION

In the design of radio receivers it generally has been the practice to provide a capacitively tuned resonant coupling circuit for an inductive antenna and to provide an inductively tuned resonant circuit for coupling a capacitive antenna to a load. This has been done in order to obtain the best signal-to-noise ratios for these two different types of antennas.

In automobile radios the whip antenna, which is commonly employed because of its desirable characteristics of low wind resistance and light weight, is an inherently high impedance capacitive antenna. It has been common practice to use variable inductive tuning in order to couple and tune this antenna to the input stage of the radio receiver placed in the automobile.

It has been found desirable, however, in automobile radios to provide a means for remote control tuning of the radio receiver; and to do this effectively, it is necessary to resort to electronic tuning means to avoid cumbersome mechanical linkages which otherwise have been to be employed. The advent of voltage variable capacitors in the form of varactor, hyperabrupt diodes has made such tuning possible, but it is necessary to tune such radio receivers by a means of the variable capacitance of the diode rather than by varying the inductance of an inductor. Thus, it becomes desirable to tune the capacitive antenna with a variable capacitance tuned circuit. Furthermore, it is necessary to couple the high reactive impedance of the antenna to a low input resistance of a transistorized radio receiver circuit to maintain proper selectivity.

SUMMARY OF THE INVENTION

It is an object of this invention to provide an improved antenna coupling circuit for coupling a high impedance reactive antenna to a low impedance resistive load.

It is another object of this invention to provide an antenna coupling circuit for coupling a high impedance reactive antenna to a low impedance resistive load, using variable capacitive tuning in the coupling circuit.

It is an additional object of this invention to provide a series tuned variable capacitive circuit connected between a high impedance reactive source and a low impedance resistive load in order to couple constant power at constant bandwidth to the load over a wide range of frequencies.

In accordance with a preferred embodiment of this invention, a high impedance reactive source is coupled to a low impedance resistive load by connecting a series tuned LC circuit in series between the source and the load with the series tuned LC circuit being tuned over a predetermined frequency range by varying the capacitance of the tuned circuit.

In a more specific embodiment of the invention, an additional variable capacitor is connected in shunt with the high impedance reactive source, and the capacitance of this additional capacitor is varied along with the capacitance of the tuned circuit in order to couple increased power to the load at higher frequencies of operation of the circuit.

DETAILED DESCRIPTION

Figure 1:
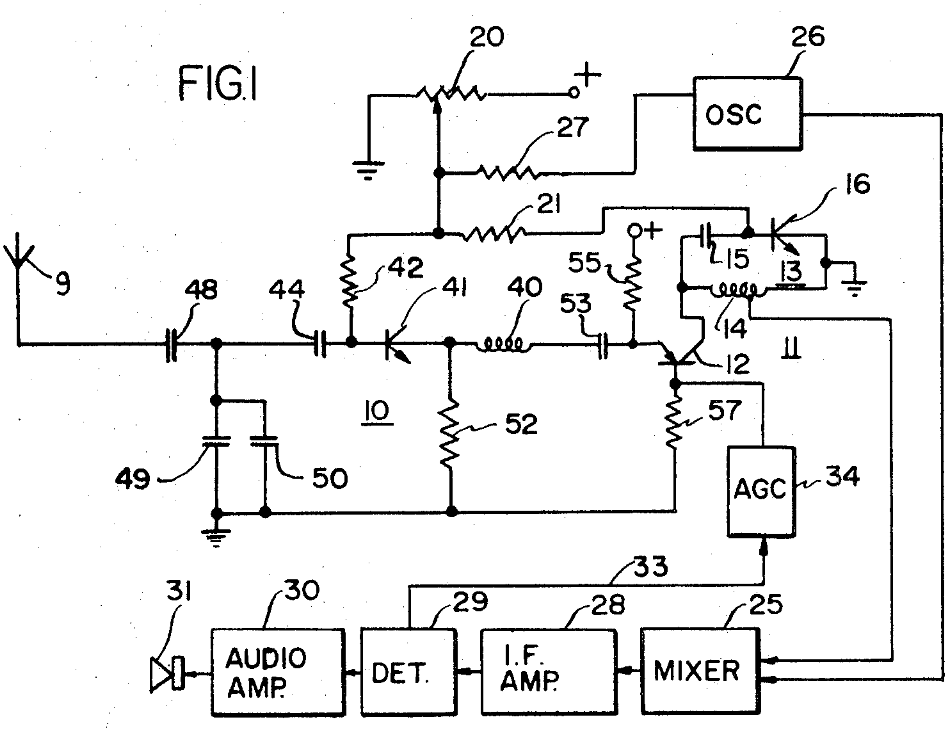
FIG. 1 is a schematic diagram, partially in block form, of a preferred embodiment of this invention.

Referring now to the drawing, in which like reference numbers are used in both FIGS. to indicate like elements, there is shown an AM radio receiver circuit for receiving signals over an antenna 9, shown as a voltage generator and associated capacitance for a better understanding of the circuit, with the antenna being coupled through a series tuned LC circuit 10 to the input of an RF amplifier stage 11 including a PNP transistor 12. The signals from the coupling circuit 10 are applied across the emitter-base path of the transistor 12 which has a tuned circuit 13 connected to its collector. The tuned circuit 13 consists of a tapped coil 14 with a blocking capacitor 15 and a voltage variable tuning capacitor 16 connected in series across the coil 14. The voltage variable capacitor 16 and the coil 14 form the resonant circuit for the RF amplifier transistor 12, and this circuit is tuned over a predetermined frequency range.

The voltage variable capacitor 16 is a two-terminal PN junction semiconductor device which exhibits a change in capacitance proportional to a change in the direct current reverse bias across the device. Voltage variable capacitors or reactive devices of this type are well known, and an increase in the reverse bias voltage across such a capacitor causes its capacitance to decrease, thereby increasing the capacitive reactance. A decreased reverse bias results in the opposite effect, that is, the capacitance of the device increases and the capacitive reactance decreases. Devices which preferably may be used for the voltage variable capacitor 16 are hyperabrupt varactor diodes since the hyperabrupt diodes exhibit great capacitance changes in response to the biasing voltage and thus are operable over a wide frequency range.

The biasing potential or tuning voltage for the voltage variable capacitor 16 is obtained from the tap of a potentiometer 20 and is applied through an isolating resistor 21 to the junction between the voltage variable capacitor 16 and the blocking capacitor 15. The potentiometer 20 may be located in the radio receiver itself or at a remote location and provides direct current potentials of varying amounts.

The selected radio frequency signal obtained from the tap on the coil 14 of the tank circuit 13 is applied to one input of a mixer 25, the other input of which receives signals from a local oscillator 26, which also may include a tuning circuit or tank circuit having a voltage variable capacitor similar to the capacitor 16. The frequency of the oscillator tank circuit also may be controlled by the biasing potential obtained from the potentiometer 20 and applied through a coupling resistor 27 to the oscillator 26 The amplified RF signals are heterodyned with the local oscillator signals from the oscillator 26 by the mixer 25 to produce intermediate frequency signals. These IF signals then are amplified in an IF amplifier 28 and are detected in a detector stage 29, which supplies the signals to an audio amplifier 30, which in turn drives a speaker 31. An automatic gain control signal is obtained from the detector 29 in a conventional manner and is applied over a lead 33 to an AGC circuit 34, the output of which is applied to the base of the transistor 12 in the RF amplifier 11 in order to provide automatic gain control of the transistor 12.

In addition to the voltage variable capacitor tuning devices in the RF tank circuit 13 and in the oscillator 26, the coupling circuit between the high impedance capacitive antenna 9 and the relatively low impedance emitter-base path of the transistor 12 includes a series tuned LC circuit including an inductor 40 and another voltage variable capacitor 41 as its principal elements. The output of the potentiometer 20 is applied through a third isolating resistor 42 to the junction of the voltage variable capacitor 41 and a blocking capacitor 44. The capacitance of the capacitor 44 is chosen to be much greater than the capacitance of the other capacitors in the circuit; so that it has little affect on the AC signals present in the circuit, while serving to block any DC signals obtained from the potentiometer 20.

When the radio receiver shown in FIG. 1 is used in an automobile, the antenna 9 is a capacitive whip antenna, represented in the circuit shown in FIG. 1 as a voltage generator and the capacitor 48 shown connected in series with the capacitor 44 and the voltage variable capacitor 41. In addition to these capacitances, additional capacitance to ground exists, due primarily to the cable which connects the whip antenna to the radio receiver; and this capacitance is in the form of a shunt capacitance represented by a capacitor 49 connected between ground and the junction of the capacitors 44 and 48. In order to adjust the radio receiver system shown in FIG. 1 to cover the AM band of frequencies normally received by such a receiver, an additional shunt capacitance 50 also may be provided across the antenna output, and is shown in FIG. 1 as also being connected between ground and the junction of the capacitors 44 and 48. The value of the capacitance 50, when added to the capacitances of the capacitors 48 and 49, forming a parallel combination in series with the capacitor 41, should provide the desired capacitance ratio to tune the AM band.

In order to provide a DC return path for the tuning voltage used to tune the voltage variable capacitor 41, a high impedance resistor 52 is connected between ground and the junction of the capacitor 41 and the inductor 40. The resistance of the resistor 52 is chosen to be very high, so that it appears essentially as an open circuit to any AC signals present in the circuit. To prevent the variable tuning voltage applied to the voltage variable capacitor 41 from adversely affecting the operating level of the transistor 12, a second DC blocking capacitor 53 is provided between the inductor 40 and the emitter of the transistor 12. Like the capacitor 44, the blocking capacitor 53 also is chosen to have a capacitance substantially in excess of the other capacitors in the circuit so as to have substantially no affect on the AC signals present.

The DC operating level for the transistor 12 is obtained in a conventional manner by means of a resistor 55 connected between a source of positive potential and the emitter and a resistor 57 connected between the base of the transistor 12 and ground potential.

In the operation of the circuit shown in FIG. 1, it may be assumed that the input resistance of the transistor 12 is constant over the frequency of the AM band; and if the unloaded Q, $Q_u$, of the inductance 40 and all of the capacitances in the tuned circuit are assumed to be much greater than the loaded Q, $Q_L$, of the circuit, then $Q_L$ equals $\omega L/R_L$. Likewise, the 3db. bandwidth, BW, of the circuit equals $f/Q_L$ where f is the frequency to which the circuit is tuned.

Extrapolating further for bandwidth, it thus can be shown that $$BW=\frac{R_L}{2\pi L}$$

where $R_L$ is the input impedance of the transistor 12, and L is the inductance of the inductor 40. This equation is derived from the previous equations since $\omega=2\pi f$ as is well known. Thus, it may be seen that the bandwidth of the circuit is constant with respect to frequency, since all of the frequency components have been dropped from the equation. Similarly by standard derivation, it may be shown that the voltage E available across the input impedance of the transistor 12 is equal to $$E=\frac{E_a C_{48}}{C_{48}+C_{49}+C_{50}}$$

where $E_a$ is the voltage supplied by the antenna 9. Since the load power $$P=\frac{E^2}{R_L}$$

it is apparent that the power also is constant with respect to frequency, since no frequency components appear in this expression either.

Thus, it is possible to tune the coupling circuit consisting of the inductor 40 and voltage variable capacitor 41 over a relatively wide range of resonant frequencies, while maintaining the bandwidth of the signal constant over the entire range along with the power coupled to the RF amplifier transistor 12. It has been found by using this circuit that when a hyperabrupt diode is employed for the capacitor 41, a frequency range of 535 kHz. to 1,620 kHz. may be tuned with a 10 kHz. bandwidth, constant over the entire range.

An additional advantage is gained by the use of the AGC voltage obtained form the AGC circuit 34 and applied to the junction of the base of the transistor 12 and the resistor 57. This AGC voltage acts in effect to change the input impedance of the transistor 12; so that when the AGC voltage increases and is used to cause the transistor 12 to conduct less, the effective input impedance of the transistor 12 appears to increase insofar as the output of the coupling circuit is concerned. As a consequence, the RF voltage available in the circuit and present across the voltage variable capacitor 41 does not increase as the antenna output voltage increases, thereby limiting the AC voltage which appears across the voltage variable capacitor diode 41 to a valve below that where the diode would rectify or partially rectify the AC signals. Such rectification of the AC signals has been found to cause degradation in the operation of circuits using diode voltage variable capacitors due to detuning of the voltage variable capacitors through the rectified DC which is present in addition to the normal DC biasing potential. The AGC signal, therefore, prevents detuning and mistracking of the circuit and other associated degradation in performance which might occur if such an AGC circuit were not used.

It should be noted in conjunction with the circuit shown in FIG. 1 that the capacitance 50 is added to compliment the cable capacitance 49 to obtain the desired band of operation of the circuit. As different cable lengths are used, the capacitance of the capacitor 49 varies accordingly; and by a corresponding adjustment of the value of the capacitance of the capacitor 50, it is possible to use this coupling circuit with an antenna located at various distances from the receiver without any adverse affect on the operation of the coupling circuit and the receiver itself.

Figure 2:
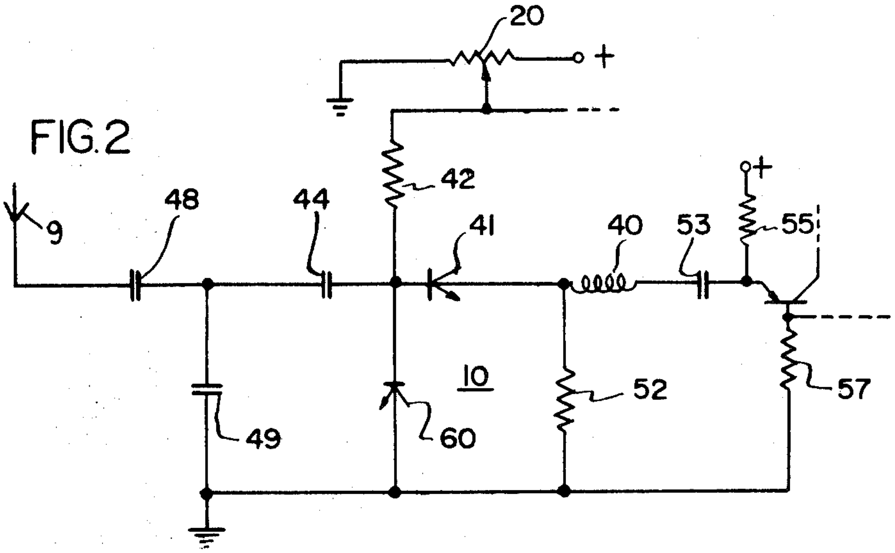
FIG. 2 is a partial schematic diagram of an additional embodiment of the invention which may be used in conjunction with the circuit shown in FIG. 1.

Referring now to FIG. 2, there is shown an alternative embodiment of the coupling circuit 10 used in conjunction with the radio receiver shown in FIG. 1. In actual practice with a coupling circuit of the type shown in FIG. 1, there is some deterioration in the signal-to-noise ratio as the frequency to which the coupling circuit is tuned approaches the high end of the band because of the relatively higher insertion losses in the circuit at the high end of the band. In order to compensate for this degradation in signal-to-noise due to the use in FIG. 1 of actual inductors and capacitors whose $Q_u$ decrease with increasing frequencies, and substantially maintaining the desirable features of providing for a constant bandwidth and relatively constant power over the entire tuning range of the circuit, a second voltage variable capacitor 60 in the form of a hyperabrupt varactor diode is connected between ground and the junction of the blocking capacitor 44 and the voltage variable capacitor 41. The capacitor 60 may be utilized in the circuit in place of the capacitor 50, or the voltage variable capacitor 60 may be used in addition to such a capacitor 50. In any event, the diode capacitor 60 is poled so as to be biased by the biasing potential applied over the resistor 42 in the same manner as the capacitor 41, that is, when the biasing potential is such as to cause an increase in the capacitance of the capacitor 41, a corresponding increase is effected in the capacitance of the capacitor 60. On the other hand, when the biasing potential applied through the resistor 42 to the junction of the capacitors 41 and 60 causes the capacitance of the capacitor 41 to decrease, the capacitance of the capacitor 60 also decreases.

Thus, both of the voltage variable diode capacitors 41 and 60 are biased simultaneously and in the same direction by the DC potential obtained from the potentiometer 20 and applied to them through the coupling resistor 42. Since the power in the load, that is into transistor 12, is approximately proportional to the square of the voltage, E, available across the load, the circuit shown in FIG. 2 improves the signal-to-noise ratio, especially at the high end of the band since this voltage is equal to $$\frac{E_a \cdot C_{48}}{(C_{48}+C_{49}+C_{60})}$$

where $E_a$ is the voltage supplied by the antenna 9. Thus, when the capacitance of the capacitor 60 is reduced by the biasing potential which is utilized to cause the corresponding reduction in the capacitance of the capacitor 41 to tune the circuit to higher frequencies, more power transfer is obtained from the circuit and is applied across the input impedance of the transistor 12 in order to obtain a better signal-to-noise ratio. The bandwidth of the circuit shown in FIG. 2 is approximately constant over the tuning range as explained previously. In all other respects the circuit shown in FIG. 2 operates in the same manner as the circuit shown in FIG. 1.

The back-to-back relationship of the diodes 41 and 60 operates to reduce distortion and provides temperature tracking of the two diodes.

We claim:

1. A coupling circuit for connecting an antenna to a load including in combination:

a capacitive antenna operating as a high impedance reactive source of AC signals;

a transistor having at least base and emitter electrodes, with the base-emitter circuit of the transistor comprising a low impedance resistive load to input signals applied thereto, the value of the impedance of the capacitive antenna being at least an order of magnitude greater than the value of impedance presented by the emitter-base circuit of the transistor;

a series-tuned LC circuit connected in series between the antenna and the emitter-base circuit of the transistor and including a variable capacitor for tuning the coupling circuit over a predetermined range of frequencies, the series-tuned LC circuit operating to couple substantially constant power at substantially constant bandwidth from the antenna to the emitter-base circuit of the transistor over said predetermined range of frequencies.

2. The combination according to claim 1, wherein the capacitor is a voltage variable capacitor and further including means for supplying a biasing voltage to the capacitor to cause its capacitance to be changed over a predetermined range.

3. The combination according to claim 2, wherein the voltage variable capacitor is a voltage variable diode capacitor which is back-biased by the biasing voltage applied thereto.

4. A circuit for coupling an antenna to a load including in combination:

a frequency dependent, high impedance capacitive antenna having an output;

a low impedance resistive load;

a first voltage variable capacitor included in a series-tuned circuit connected in series between the antenna and the load, said series-tuned circuit being the only tuned circuit connected between the antenna and the load;

a second voltage variable capacitor connected in shunt across the antenna output; and means for applying DC bias potential to the first and second voltage variable capacitors for tuning the capacitors over a predetermined range, with the first variable capacitor operating to tune the antenna circuit across a predetermined range of frequencies and with the second voltage variable capacitor causing an increase in the power transfer from the antenna to the load as the range of frequencies to which the antenna is tuned by the first voltage variable capacitor increases.

5. The combination according to claim 4 wherein the first and second voltage variable capacitor are voltage variable diode capacitors.

6. The combination according to claim 5 wherein the first and second voltage variable capacitors are provided with the same DC biasing potential.

7. The combination according to claim 6 wherein the voltage variable capacitor diodes are connected at a junction in a back-to-back relationship, with the biasing potential being applied to the junction between the diodes.